(12) United States Patent
Rueger et al.

(10) Patent No.: US 9,513,878 B2
(45) Date of Patent: Dec. 6, 2016

(54) COMPONENT INTEGRATION BY DISTRIBUTION OF SCHEMA DEFINITION ON HETEROGENOUS PLATFORMS

(71) Applicants: Christel Rueger, Hanau (DE); Rainer Schaefer, Rauenberg (DE); Marcus Hoepfner, Leimen (DE); Matthias Jensen, Walldorf (DE); Joerg Weller, Heidelberg (DE); Thomas Rinneberg, Schriesheim (DE); Mario Kabadiyski, Walldorf (DE)

(72) Inventors: Christel Rueger, Hanau (DE); Rainer Schaefer, Rauenberg (DE); Marcus Hoepfner, Leimen (DE); Matthias Jensen, Walldorf (DE); Joerg Weller, Heidelberg (DE); Thomas Rinneberg, Schriesheim (DE); Mario Kabadiyski, Walldorf (DE)

(73) Assignee: SAP SE, Waldorf (DE)

( * ) Notice: Subject to any disclaimer, the term of this patent is extended or adjusted under 35 U.S.C. 154(b) by 23 days.

(21) Appl. No.: 13/723,624

(22) Filed: Dec. 21, 2012

(65) Prior Publication Data

US 2014/0181783 A1     Jun. 26, 2014

(51) Int. Cl.
G06F 9/44     (2006.01)

(52) U.S. Cl.
CPC ..................... *G06F 8/35* (2013.01)

(58) Field of Classification Search
CPC ................. G06F 8/20; G06F 8/30; G06F 8/35
See application file for complete search history.

(56) References Cited

U.S. PATENT DOCUMENTS

| | | | |
|---|---|---|---|
| 6,327,698 B1* | 12/2001 | Kolluru | 717/104 |
| 2003/0191803 A1* | 10/2003 | Chinnici et al. | 709/203 |
| 2006/0010429 A1* | 1/2006 | Ihara | 717/126 |
| 2006/0064667 A1* | 3/2006 | Freitas | 717/104 |
| 2006/0168558 A1* | 7/2006 | de Seabra e Melo et al. | 717/105 |
| 2009/0249330 A1* | 10/2009 | Abercrombie et al. | 718/1 |
| 2009/0319981 A1* | 12/2009 | Akkiraju et al. | 717/104 |
| 2011/0088011 A1* | 4/2011 | Ouali | 717/105 |
| 2014/0033167 A1* | 1/2014 | Solovey et al. | 717/104 |

OTHER PUBLICATIONS

Technology stack, Oct. 27, 2011 at 21:26, http://en.wikipedia.org/wiki/Technology_stack.*

* cited by examiner

*Primary Examiner* — Chat Do
*Assistant Examiner* — Sergio J Curbelo, III
(74) *Attorney, Agent, or Firm* — Buckley, Maschoff & Talwalkar LLC

(57) ABSTRACT

According to some embodiments, a method and system including a first technology stack to receive a model description describing defining aspects of an application model; to generate, according to the model description, a model entity representation of the application model; and to transfer the model description to a second technology stack; and a second technology stack to generate, according to the model description, a model entity representation of the application model.

18 Claims, 5 Drawing Sheets

400

RECEIVE A MODEL DESCRIPTION, THE MODEL DESCRIPTION
DESCRIBING DEFINING ASPECTS OF AN APPLICATION MODEL
S405

SERIALIZE AN INSTANCE OF A MODEL ENTITY REPRESENTATION
OF THE APPLICATION MODEL, THE INSTANCE OF THE MODEL
ENTITY REPRESENTATION OF THE APPLICATION MODEL
ADHERING TO THE MODEL DESCRIPTION
S410

TRANSFER THE SERIALIZED INSTANCE OF THE MODEL ENTITY
REPRESENTATION OF THE APPLICATION MODEL AND THE MODEL
DESCRIPTION TO ANOTHER TECHNOLOGY STACK
S415

RECEIVE THE SERIALIZED INSTANCE OF THE MODEL ENTITY
REPRESENTATION OF THE APPLICATION MODEL AND
THE MODEL DESCRIPTION
S420

DESERIALIZE, IN ACCORDANCE WITH THE MODEL DESCRIPTION,
THE SERIALIZED INSTANCE OF THE MODEL ENTITY
REPRESENTATION OF THE APPLICATION MODEL
S425

*FIG. 4*

COMPONENT INTEGRATION BY DISTRIBUTION OF SCHEMA DEFINITION ON HETEROGENOUS PLATFORMS

FIELD

Some embodiments relate to software development. More specifically, some embodiments relate to a method and system for efficiently and robustly distributing a model description through a heterogeneous development platform.

BACKGROUND

According to some programming methodologies, software development may be model driven. In model driven development, models of the software application may be represented as instances of a model entity representations and relationships therebetween. In some instances, various technology stacks may be used throughout a development landscape. However, the model representations must be implemented for each technology stack that uses or consumes the model representations. Additionally, there are often many changes to a model description during the development process.

Due to some of the foregoing realities, methods and systems are desired to efficiently and accurately define, create, deploy, and otherwise handle model descriptions associated with application development.

BRIEF DESCRIPTION OF THE DRAWINGS

FIG. 4 is a flow diagram of a process, relating to some embodiments herein.

DETAILED DESCRIPTION

In an effort to more fully and efficiently use application development resources in a heterogeneous platform landscape comprising multiple different technology stacks, an application development methodology and techniques of using that methodology may be developed to distribute a model description from one single point through the heterogeneous platform landscape. In some embodiments, the model description is used by each technology stack to generate model representations. In some embodiments, the model description is used by each technology stack to create and/or deploy a model.

Figure 1:
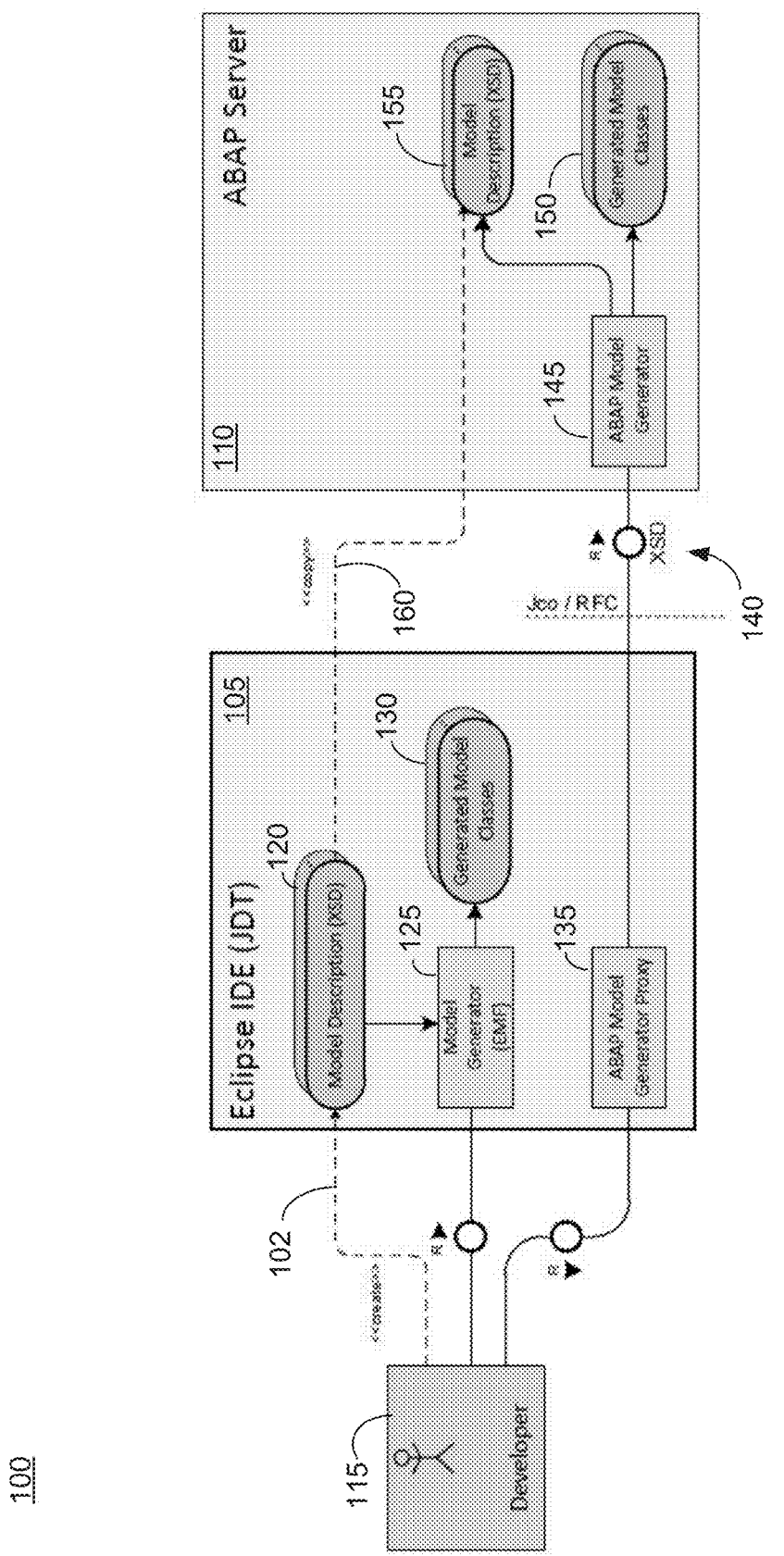
FIG. 1 is an illustrative depiction of a system to define a model description, according to some embodiments.

In some aspects, software development may follow a model driven development methodology where models are used to represent system elements, structures, and other aspects (e.g., relationships). FIG. 1 is an illustrative depiction of a system 100 that may be used to define a model description associated with a software application, according to some embodiments. The model description may describe defining aspects (e.g., elements, structures, and the relationships therebetween) of an application. In the example of FIG. 1, system 100 includes a client 105 running an integrated development environment (IDE) and a server 110. A developer 115 may interact with client 105 through a user interface, including tables and/or graphical elements. In some aspects, client 105 may create a model and server 110 may consume the model. In some instances, client 105 and server 110 may each comprise a technology stack different from the other. At various points in the development and deployment of an application the model may be transferred between the different technology stacks.

Referring to FIG. 1, developer 115 may create, edit, or provide a model description to client 105. In some embodiments, the model description may be provided as a file or other data structure and be expressed by a schema language. In some instances, the schema language may be the eXtensible markup Language (XML) Schema language, also known as XSD (XML Schema Definition). Accordingly, developer 115 may edit a XSD file that describes the structures that define and constitute a valid model of a particular application. As an example, the XSD file may include a description of fields in a table, the technical type of a field, and other aspects of the model associated with an application being developed. The XSD file may be created and provided to client 105 as indicated by line 102 (not an actual communication line). At the request of developer 115, client 105 may generate model class representation(s) of the model based on the XSD file stored at 120. Model generator 125 generates the model entity representation(s) of the model. In some instances, model generator 125 may use Eclipse Modeling Framework (EMF) tools to generate the model entity representations. In some aspects, the model entity representation(s) may include model classes, model interfaces, model structures (structure variables), model lists. The generated model entity representation (e.g., classes) may be stored at 130.

In some embodiments, the generated model entity representation(s) of the model (e.g., the model classes and interfaces) 130 are specific to the technology stack comprising client 105 (i.e., platform-specific). For example, client 105 may comprise the Eclipse IDE for Java using plug-ins (Java Development Tools, JDT) that support the development of Java applications. Accordingly, the model entity representation(s) 130 generated by model generator 125 are expressed in Java.

Still referring to FIG. 1, server 110 may comprise a technology stack different from the technology stack of client 105. For example, server 110 may comprise an ABAP server running ABAP applications written in the ABAP programming language.

In some aspects, server 110 may use a model entity representation of a software application model in a modeling (or other) process. As such, server 110 may need model entity representations of the software application. Server 110 includes a model generator 145. In some embodiments, server 110 may generate a model entity representation of the model in the language of the technology stack comprising the server (e.g., ABAP). A copy of the model description (i.e., the XSD file) used by model generator 125 of client 105 to generate the model entity representation(s) therein is transferred to server 110 so that server 110 may use the same model description to generate model entity representation(s) by (ABAP) model generator 145. In some instances, a model generator proxy 135 in client 105 connects to server 110 and pushes the model description XSD file to the ABAP server. The XSD file may be transferred to server 110 through RFC (Remote Function Calls) using Java Connector over a network, as illustrated at 140. As also illustrated in FIG. 1, a copy of the XSD filed is stored at 155 (dotted line 160 is not an actual communication line/channel). In this manner, the model entity representation(s) of a model generated by model generator 125 of client 105 in a first programming language (e.g., Java) represents the same structure(s) as the model entity representation(s) generated by model generator 145 of server 110 that are expressed in a second programming language (e.g., ABAP) and stored at 150.

In some embodiments, the model description (e.g., the XSD file) may be automatically transferred from client 105 to server 110 in response to an action at the client. For example, the model description may be automatically transferred or sent to server 110 from client 105 when developer 115 creating or editing the model description saves the model description file. That is, the model description may be automatically transferred or sent to server 110 from client 105 when the developer presses, for example, a "SAVE" button in the UI of the client.

Figure 2:
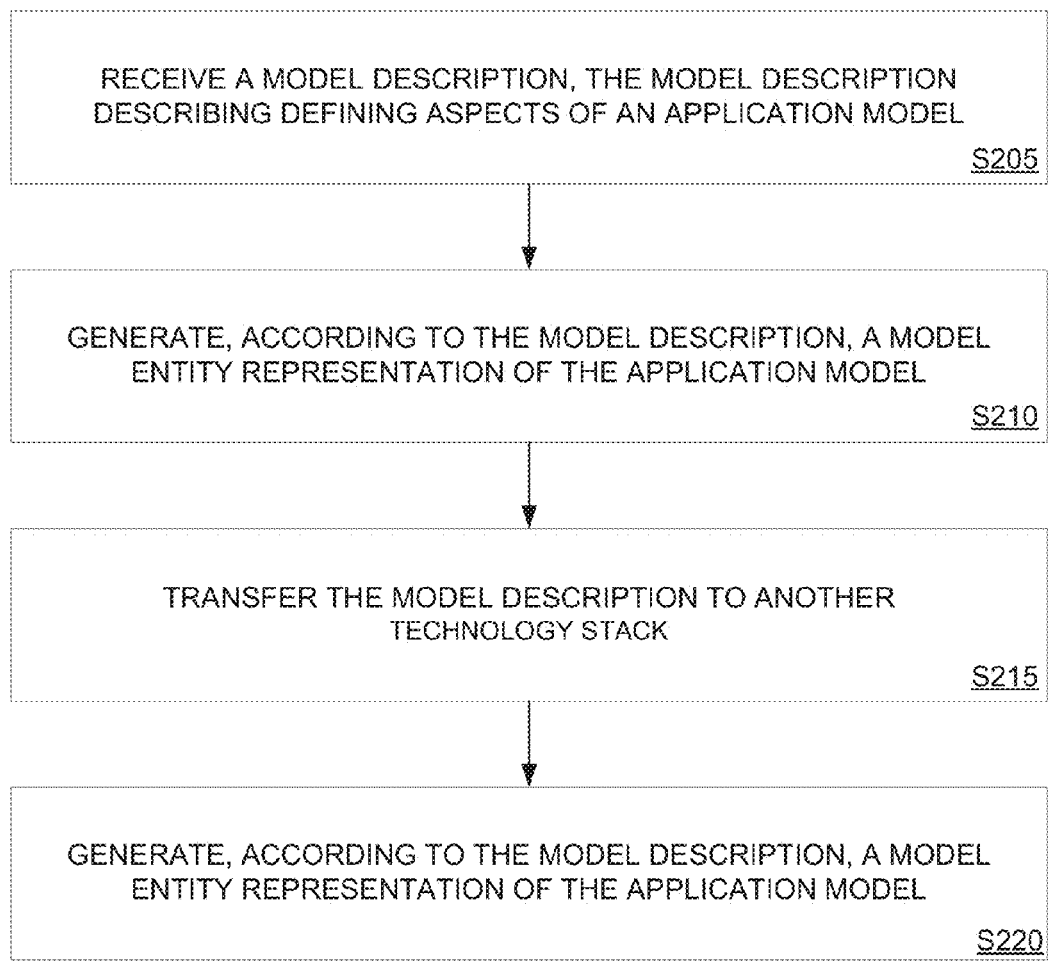
FIG. 2 is a flow diagram of a process, according to an embodiment.

FIG. 2 is a flow diagram of a process 200, according to an embodiment herein. In some aspects, process 200 relates to a process to define and distribute a model description associated with a software application. In some regards, process 200 references a process that may be implemented, at least in part, by system 100 of FIG. 1. At operation S205, a model description is received by a client. The client comprises a technology stack conforming to a particular operating system and programming language. The model description describes the defining aspects of a software application model. That is, the model description describes the requisite aspects for a valid representation of the model.

At operation S210, a model entity representation of the application model is generated based on and in accordance with the model description. The generated model entity representation(s) adhere to the model description. In adhering to the model description, the generated model entity representation(s) is a valid representation of the associated application.

Process 200 proceeds to operation S215 where the model description is transferred to a server (or other device, component, system, service, etc.) comprising a technology stack different from that of the client of operation S205. The model description may comprise a file. The model description file may be expressed in a format suitable for describing an application model and for transmission over a communication network such as, for example, an XSD file. The model description may be received and stored by the receiving server (or other device, component, system, service, etc.) for an immediate or later use.

At S220, a model entity representation of the application model is generated by the receiving server based on and in accordance with the model description. The generated model entity representation adheres to the model description. In adhering to the model description, the model entity representation generated at operation S220 by a server is a valid representation of the associated application. Moreover, model entity representation(s) of the application model generated at S210 by a first technology stack in a first programming language (e.g., Java) represents the same structure(s) as the model entity representation(s) generated at S220 by a second technology stack and expressed in a second programming language (e.g., ABAP).

Figure 3:
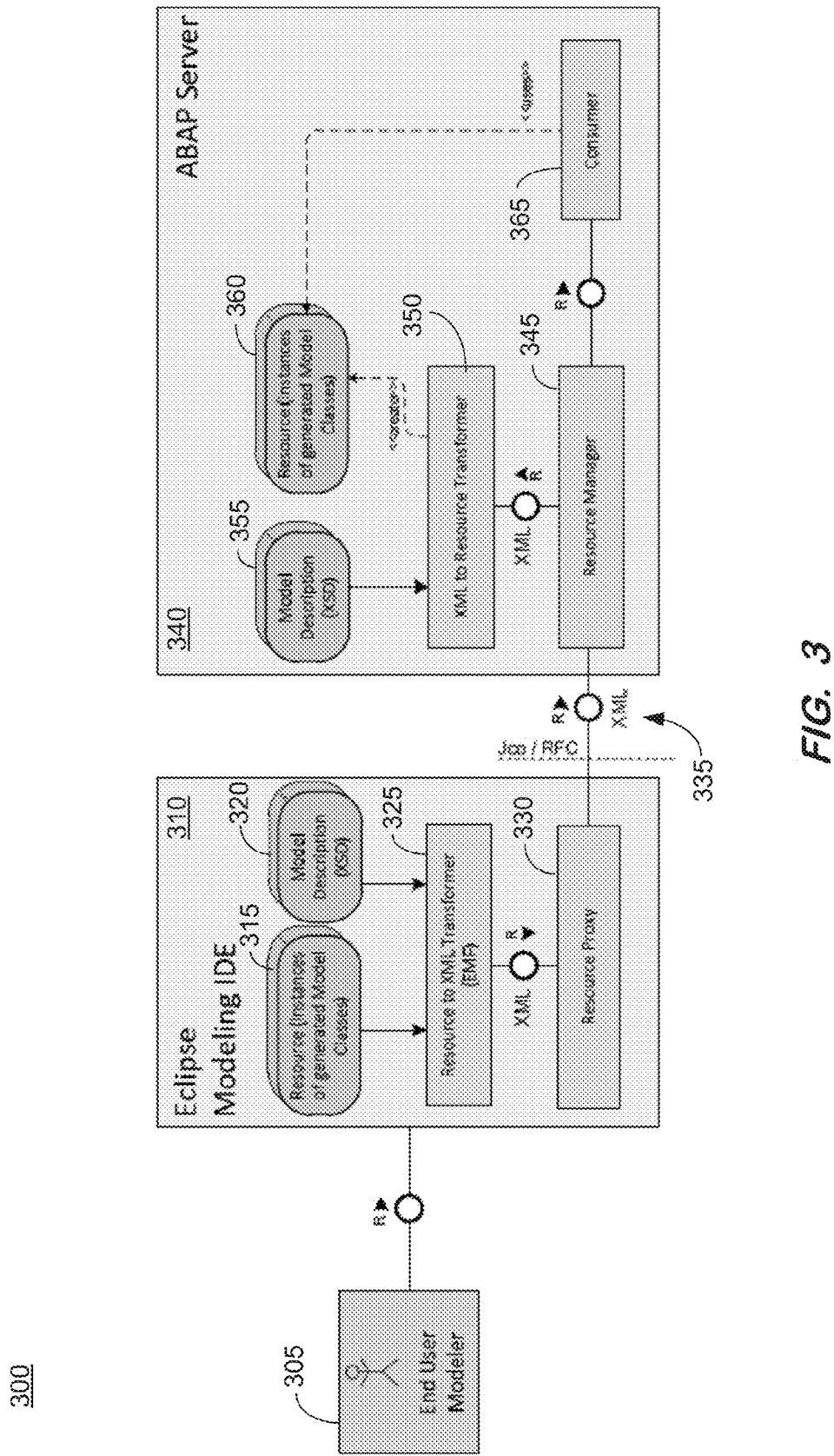
FIG. 3 is an illustrative depiction of a system to create and deploy an instance of a model using a model description, according to some embodiments.

FIG. 3 is an illustrative depiction of a system 300 that may be used during a design time by an end user modeler 305 to create instances of a model associated with a software application. Accordingly, system 300 will be referred to herein to describe aspects and operations to create a model. In the example of FIG. 3, system 300 includes a client 310 running a modeling integrated development environment (IDE) and a server 340. Modeler 305 may interact with client 310 through a user interface, including a form based and/or graphical editor. In some aspects, client 310 may create an instance of a model and server 340 may consume the instance of the model using, for example, a check function, a generation function, or other function or process. In some instances, client 310 and server 340 may each comprise a technology stack different from the other. In the example of FIG. 3, client 310 comprises the Eclipse Modeling IDE.

In order for the server to consume the model, the server needs the instances of the generated model entities from the client. As mentioned above, the client and server comprise different technology stacks. In accordance with some embodiments herein, the instance(s) of the generated model entities (e.g., model classes in the example of FIG. 3 at 315) are serialized by the client. In the example of FIG. 3, client 310 uses the Eclipse Modeling Framework (EMF) to serialize the instance(s) of the model (i.e., generated model classes) by converting the generated model entities into XML by the resource to XML transformer 325. In order to properly transform the model classes into a serialized representation of the instance(s) of the model entities (e.g., XML), the transformer 325 serializes the instance(s) of the model classes with the use of and in accordance with the model description file (e.g., XSD file) 320.

It is noted that in some embodiments, the model entities such as, for example, model classes, interfaces, structure, lists, and other structures may be serialized by means other than EMF. Any system, component, service, or device may be used to deconstruct the instance(s) of the model entities into a sequence of bytes (i.e., serialization). In some embodiments, the rendering of the serialization may be a file other than XML, including, for example, binary data, text data, or some other created file format.

Resource proxy 330 passes the XML file to the server's resource manager 345. The XML file may be transferred to server 340 through RFC using Java Connector (i.e., Jco/RFC) over a network, as illustrated at 335. Resource manager 345 receives the XML including the serialized representation of the instances of the model entities (e.g., classes) and passes the XML file to the XML to resource transformer 350. In order to properly deserialize the XML file, transformer 350 receives a previously stored, obtained, or received copy of the model description 355 and uses it to create (valid) instances of the generated model classes 360 in the ABAP programming language. Server 340 uses a copy of the same XSD file to deserialize the XML file that was used by client 310 to serialize instances of generated model entities into the XML file.

The instances of the generated model classes 360 may be consumed in some functionality of the server. Consumer 365 may consume or use the instances of the generated model classes 360 by, for example, using them in a save functionality, a check functionality, deployment functionality, and other processes.

In accordance with some aspects herein, consumer 365 need not understand or be knowledgeable of the XML or XSD files. Consumer 365 need only to be able to use (i.e., consume) the generated instances of the model classes 360.

In some embodiments, system 300 may support embodiments where the roles of the server 340 and the client 310 are inversed. For example, in some embodiments server 340 may operate to serialize the model representations and client 310 may operate to deserialize and consume the model representations.

FIG. 4 is a flow diagram of a process 400, according to an embodiment herein. In some regards, process 400 references a process that may be implemented, at least in part, by system 300 of FIG. 3. At operation S405, a model description is received by, for example, a modeling client. The client comprises a technology stack conforming to a particular operating system and programming language. The model description describes the defining aspects of a software application model.

At operation S410, instance(s) of generated model entities are serialized. The serialized file is generated based on and in accordance with the model description. In adhering to the model description, the serialized file includes an accurate representation of the associated application model.

Process 400 proceeds to operation S415 where the serialized file (e.g., XML file) is transferred to a server (or other device, component, system, service, etc.) comprising a technology stack different from that of the client of operation S410.

At S420, the serialized instance of the generated model entities is received. Additionally, the model description is retrieved or otherwise obtained. The model description is used to properly deserialize the XML file at S425 to create (valid) instances of the model classes 360 represented by the serialized file in the programming language of the server.

In accordance with some aspects herein, one model description is used by the different technology stacks. For example, the same model description is used by the client and the server although they each comprise a technology stack different from the other. In some embodiments, more than one server may be included in a development system or landscape, where servers may operate using different technology stacks. Per aspects of the present disclosure, one common model description can be distributed to each of the servers and the servers can, for example, generate valid model entities representations based on that one model description.

In some embodiments, changes to a model description may be efficiently distributed through a heterogeneous development landscape by using the process disclosed herein. For example, a change to the one model description during a development process may be propagated through the heterogeneous development landscape to the different technology stacks. In some embodiments, the changed model description file (e.g., XSD file) may be distributed through the development landscape in response to a single action (i.e., one click) such as, for example, a single "save" activation.

Figure 5:
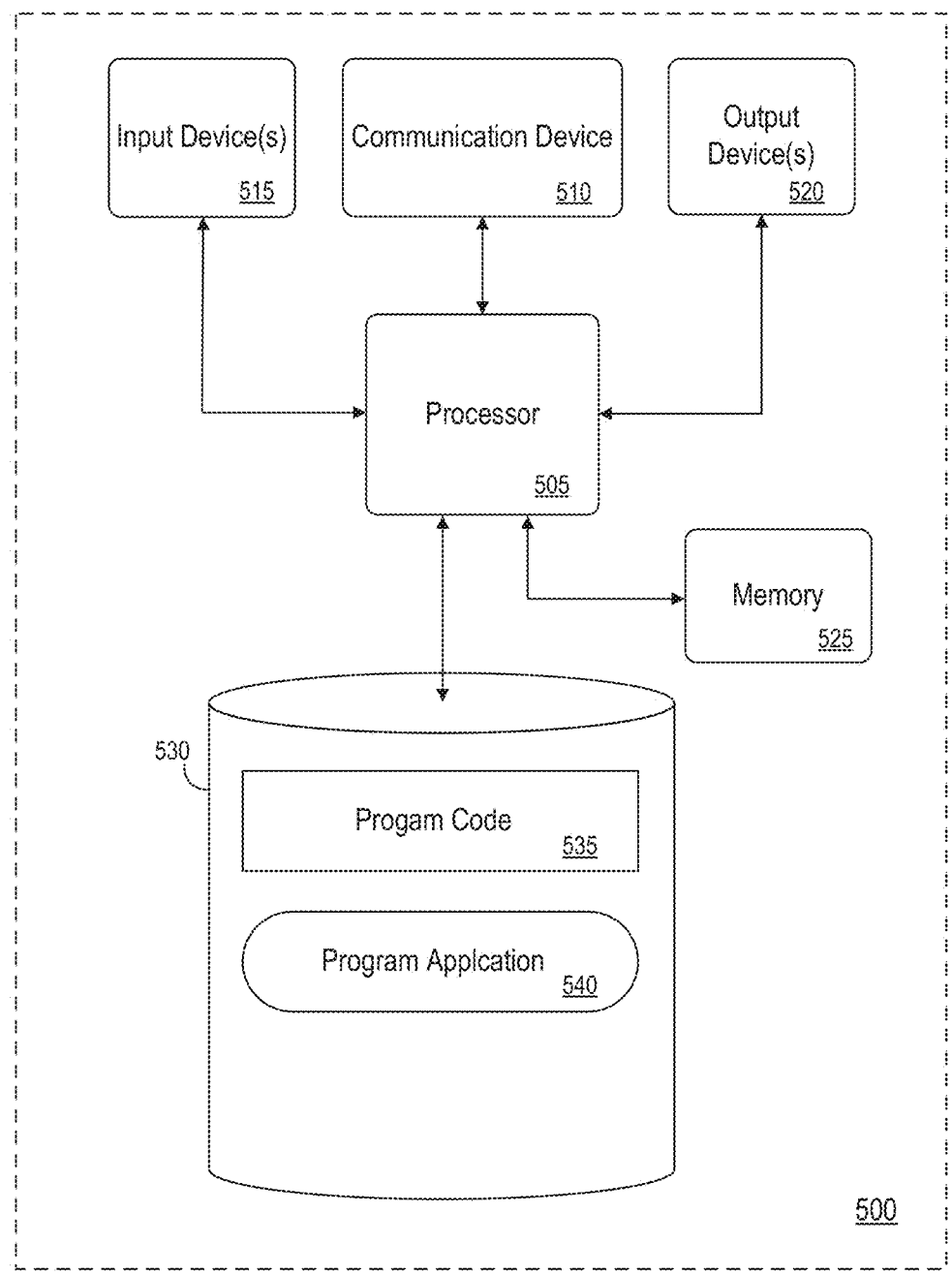
FIG. 5 is a block diagram of a system, according to some embodiments.

FIG. 5 is an illustrative block diagram of a system 500 that may be used to implement some embodiments herein. In some aspects, system 500 may comprise one or more devices, components, or systems that support different technology stacks such as, for example, technology stacks 110, 140, 310, and 340. In some aspects, processes disclosed herein may be implemented, at least in part, by system 500. System 500 may comprise a general-purpose computing apparatus and may execute program code to perform any of the processes described herein, such as, but not limited to processes 200 and 400. System 500 may include elements other than those specifically depicted in FIG. 5, according to some embodiments.

System 500 includes processor 505 operatively coupled to communication device 510, data storage device 530, one or more input devices 515, one or more output devices 520 and memory 525. Communication device 510 may facilitate communication with other devices and other technology stacks. Input device(s) 515 may comprise, for example, a keyboard, a keypad, a mouse or other pointing device, a microphone, knob or a switch, an infra-red (IR) port, a docking station, and/or a touch screen. Input device(s) 515 may be used, for example, to enter information into system 500. Output device(s) 520 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 525 may comprise Random Access Memory (RAM).

Program code 535 of data storage device 530 may be executable by processor 505 to provide any of the processes described herein. In some embodiments, program code 535 may include for example, code of an operating system (OS). Embodiments are not limited to execution of these processes by a single apparatus. Application program 540 may include instructions that may be executed processor 505. Data storage device 530 may also store data and other program code for providing additional functionality and/or which are necessary for operation thereof, such as device drivers, operating system files, etc.

Each system described herein may be implemented by any number of devices in communication via any number of other public and/or private networks. Two or more of the devices herein may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, the method comprising:

receiving, by a first technology stack, a model description, the model description describing requisite aspects of a valid model entity representation of an application model and being distinct from a model entity described thereby;

generating, in a first language of the first operating system and based on the model description, a model entity representation of the application model by the first technology stack adhering to the model description;

transferring the model description to a second technology stack, wherein the first technology stack conforms to a first operating system and the second technology stack conforms to a second operating system different from the first operating system;

generating, in a second language of the second operating system and based on the model description, a model entity representation of the application model by the second technology stack adhering to the model description;

and generating (i) an application specific to the first technology stack based on the model entity representation, generated by the first technology stack and (ii) an application specific to the second technology stack based on the model entity representation, generated by the second technology stack.

2. The method of claim 1, wherein the model description is expressed using an eXtensible Markup Language (XML) schema language.

3. The method of claim 1, wherein the model entity representation of the model application by the first technology stack and the second technology stack represents at least one of a model class, a model interface, a model structure, and a model list of the application model.

4. The method of claim 1, further comprising generating the model description.

5. The method of claim 1, wherein each of the first technology stack and the second technology stack includes a model generator for generating the model entity representation for each respective technology stack.

6. A computer implemented method, comprising:

receiving, by a first technology stack, a model description, the model description describing requisite aspects of a valid model entity representation an application model and being distinct from a model entity described thereby;

serializing, by the first technology stack, an instance of a model entity representation of the application model, the instance of the model entity representation of the application model being in a first language of the first technology stack and based on adhering to the model description;

transferring the serialized instance of the model entity representation of the application model and the model description to a second technology stack;

receiving, by the second technology stack, the serialized instance of the model entity representation of the application model and the model description;

deserializing, by the second technology stack and based on the model description, the serialized instance of the model entity representation of the application model, wherein the first technology stack conforms to a first operating system and the second technology stack conforms to a second operating system different from the first operating system, wherein the deserialized instance of the model entity representation of the application model is in a second language of the second technology stack, and generating (i) an application specific to the first technology stack based on the model entity representation, generated by the first technology stack and (ii) an application specific to the second technology stack based on the model entity representation, generated by the second technology stack.

7. The method of claim 6, wherein the model description is expressed using an eXtensible Markup Language (XML) schema language.

8. The method of claim 6, wherein the model description represents at least one of a model class, a model interface, a model structure, and a model list of the application model.

9. The method of claim 6, further comprising the second technology stack consuming the model description.

10. A system, comprising:

a first memory;

a first processor in communication with the first memory and executing a first technology stack to:

receive a model description, the model description describing defining aspects of an application model and being distinct from a model entity described thereby;

generate, in a first language of the first technology stack and based on the model description, a model entity representation of the application model adhering to the model description;

and transfer the model description;

and a second memory;

and a second processor in communication with the second memory and executing a second technology stack to:

receive a model description;

generate, in a second language of the second technology stack and based on the model description, a model entity representation of the application model adhering to the model description, wherein the first technology stack conforms to a first operating system and the second technology stack conforms to a second operating system different from the first operating system;

the first processor being configured to, generate an application specific to the first technology stack based on the model entity representation, generated by the first technology stack and the second processor being configured to, generate an application specific to the second technology stack based on the model entity representation, generated by the second technology stack.

11. The system of claim 10, wherein the model description is expressed using an eXtensible Markup Language (XML) schema language.

12. The system of claim 10, wherein the model entity representation of the model application by the first technology stack and the second technology stack represents at least one of a model class, model interface, a model structure, and model list of the application model.

13. The system of claim 10, wherein the first technology stack is further configured to generate the model description.

14. The system of claim 10, wherein each of the first technology stack and the second technology stack includes a model generator to generate the model entity representation by each respective technology stack.

15. A system, comprising:

a first memory;

a first processor in communication with the first memory and executing a first a first technology stack to:

receive a model description, the model description describing requisite aspects of a valid representation of an application model and being distinct from a model entity described thereby;

serialize an instance of a model entity representation of the application model, the instance of the model entity representation of the application model being in a first language of the first technology stack and based on the model description;

and transfer the serialized instance of the model entity representation of the application model and the model description;

and a second memory;

and a second processor in communication with the second memory and executing a second technology stack to:

receive the serialized instance of the model entity representation of the application model and the model description;

and deserialize, in accordance with the model description, the serialized instance of the model entity representation of the application model, wherein the first technology stack conforms to a first operating system and the second technology stack conforms to a second operating system different from the first operating system, wherein the deserialized instance of the model entity representation of the application model is in a second language of the second technology stack;

the first processor being configured to, generate an application specific to the first technology stack based on the model entity representation, generated by the first technology stack and the second processor being configured to, generate an application specific to the second technology stack based on the model entity representation, generated by the second technology stack.

16. The system of claim 15, wherein the model description is expressed using an eXtensible Markup Language (XML) schema language.

17. The system of claim 15, wherein the model description represents at least one of a model class, model interface, a model structure, and model list of the application model.

18. The system of claim 15, further comprising the second technology stack to consume the model description.

* * * * *